United States Patent
Taillan et al.

(10) Patent No.: US 11,866,561 B2
(45) Date of Patent: Jan. 9, 2024

(54) FIBERGLASS VEILS CONTAINING FIRE-RETARDANT MINERALS AND REFRACTIVE PARTICLES, AND HIGH GLOSS AND/OR FIRE-RETARDANT AND/OR NON-COMBUSTIBLE LAMINATES CONTAINING SUCH VEILS

(71) Applicant: THE DILLER CORPORATION, Cincinnati, OH (US)

(72) Inventors: Frederic Taillan, Kings Mills, OH (US); Abbie L. Kramer, Cold Spring, KY (US); David R. Green, Milford, OH (US)

(73) Assignee: THE DILLER CORPORATION, Cincinnati, OH (US)

( * ) Notice: Subject to any disclaimer, the term of this patent is extended or adjusted under 35 U.S.C. 154(b) by 125 days.

(21) Appl. No.: 17/379,512

(22) Filed: Jul. 19, 2021

(65) Prior Publication Data
US 2022/0017713 A1     Jan. 20, 2022

Related U.S. Application Data

(60) Provisional application No. 63/053,016, filed on Jul. 17, 2020.

(51) Int. Cl.
| | | |
|---|---|---|
| *C08J 5/24* | (2006.01) | |
| *B32B 17/04* | (2006.01) | |
| *B32B 5/26* | (2006.01) | |
| *B32B 5/02* | (2006.01) | |
| *C08K 3/22* | (2006.01) | |

(52) U.S. Cl.
CPC ............... *C08J 5/244* (2021.05); *B32B 5/022* (2013.01); *B32B 5/266* (2021.05); *C08K 3/22* (2013.01); *B32B 2262/101* (2013.01); *B32B 2264/1022* (2020.08); *B32B 2307/3065* (2013.01); *B32B 2307/718* (2013.01); *B32B 2451/00* (2013.01); *C08J 2361/28* (2013.01); *C08K 2003/2227* (2013.01); *C08K 2003/2241* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 4,112,174 A | 12/1978 | Hannes et al. | |
| 4,129,674 A | 12/1978 | Hannes et al. | |
| 4,681,802 A | 7/1987 | Gaa et al. | |
| 4,810,576 A | 3/1989 | Gaa et al. | |
| 5,484,653 A | 1/1996 | Kennedy et al. | |
| 6,187,697 B1 | 2/2001 | Jaffee et al. | |
| 8,084,378 B2 | 12/2011 | Jaffee et al. | |
| 2006/0234027 A1* | 10/2006 | Huusken | B32B 33/00 428/292.1 |
| 2022/0243400 A1* | 8/2022 | Khandel | D06N 3/0063 |

FOREIGN PATENT DOCUMENTS

| | | |
|---|---|---|
| DE | 202014010547 U1 | 12/2015 |
| WO | 2008008510 A2 | 1/2008 |
| WO | 2019032393 A1 | 2/2019 |

* cited by examiner

*Primary Examiner* — Michael J Feely
(74) *Attorney, Agent, or Firm* — FLASTER GREENBERG P.C.

(57) ABSTRACT

Non-woven fiberglass veils, and laminates made therefrom, comprising: a plurality of glass fibers; a resin component; a fire-retardant component; and a particulate component, the particulate component comprising inorganic particles having a refractive index higher than a refractive index of the fire-retardant component and an average particle size of from about 0.1 to about 0.5 μm; wherein the fire-retardant component and the particulate component are present in a combined amount of from about 50% to about 90% by weight, based on the total weight of the veil, and wherein the fire-retardant component and the particulate component are present in a ratio by weight of from about 95:5 to about 50:50; are described.

21 Claims, 5 Drawing Sheets

FIBERGLASS VEILS CONTAINING FIRE-RETARDANT MINERALS AND REFRACTIVE PARTICLES, AND HIGH GLOSS AND/OR FIRE-RETARDANT AND/OR NON-COMBUSTIBLE LAMINATES CONTAINING SUCH VEILS

CROSS-REFERENCE TO RELATED APPLICATIONS

This application claims the benefit of U.S. Provisional Patent Application No. 63/053,016, filed Jul. 17, 2020, the entire contents of which are hereby incorporated herein by reference.

BACKGROUND OF THE INVENTION

Composite materials are known. Various composite materials are used in laminated multi-layer building materials for their combination of strength, weight and mechanical properties. For example, fiberglass mats or veils have been used in materials laminated using various resins to create architectural panels.

Often, it can be important for certain uses to provide safety features to such composite panels, including for example, fire resistance. Thus, for example, fire-retardant materials can be incorporated into fiberglass mats and veils.

Often, it can be desirable to provide such panels with decorative aspects on a surface. However, fiberglass panels are often rough in terms of topography. Variations in fiber content and arrangement can show on exposed surfaces of the mats and can be amplified in resulting laminates. Inclusion of decorative overlays on such surfaces can further amplify the visualization of such surface roughness.

Additionally, such surface roughness and irregularity results in an inability to print decorative images on such surfaces with acceptable image quality and high gloss.

BRIEF SUMMARY OF THE INVENTION

The present invention is directed, in general, to fiberglass veils, and in particular fiberglass veils that provide laminates with improved surface smoothness, regularity and gloss properties. More particularly, various aspects and embodiments of the invention are directed to fiberglass veils which include glass fibers, a resin component, a fire-retardant component and an additional particulate component. Various embodiments disclosed herein can include a non-woven glass fiber veil coated or impregnated with slurry containing a fire retardant particle component and a low surface area to volume ratio particle component (i.e., a light-scattering component, having an index of refraction higher than that of the fire-retardant component) dispersed in an aqueous resin binder system. Resin binders may be the same or different as resin binders employed to form fiberglass veils to be treated with a disclosed slurry. Various embodiments may further include coloring additives (e.g., pigments, dyes, etc.). Various embodiments disclosed herein can include a non-woven glass fiber veil formed in, for example, a wet-laid process wherein a resin binder system used to form the veil includes a fire retardant particle component and a low surface area to volume ratio particle component dispersed in the resin binder.

Various embodiments of the present invention include multilayer laminates wherein at least one layer is a fiber glass veil in accordance with the disclosure herein. Embodiments of the present invention can include laminates comprised of several layers of fiberglass veils according to the disclosure herein. Various embodiments can include laminates with additional decorative layers, or overlays. Laminates in accordance with the present invention can include an outer decorative layer which is a fiberglass veil in accordance with the current disclosure. Thus, various embodiments of the present invention can be used in conjunction with a decorative surface layer, or may comprise the decorative surface layer. In various embodiments of the present invention, a fiberglass veil can be used as a substrate to print a decorative design. Various embodiments of the present invention can be used to create high gloss products, and products which meet various national fire standards from fire retardant to non-combustible. Various embodiments of the present invention can be used as a white barrier to provide opacity for light color, low basis weight decorative layers. Various embodiments of the present invention can provide anti-microbial properties. Various embodiments of the present invention can be used for interior and exterior grade applications, and can be used in conjunction with other core materials to achieve desired final properties.

One embodiment of the present invention includes a non-woven fiberglass veil, comprising: a plurality of glass fibers; a resin component; a fire-retardant component; and a particulate component, the particulate component comprising inorganic particles having a refractive index higher than a refractive index of the fire-retardant component and an average particle size of from about 0.1 to about 0.5 µm; wherein the fire-retardant component and the particulate component are present in a combined amount of from about 50% to about 90% by weight, based on the total weight of the veil, and wherein the fire-retardant component and the particulate component are present in a ratio by weight of from about 95:5 to about 50:50.

In various preferred embodiments of the present invention, the fire-retardant component comprises at least one selected from aluminum trihydrate, zinc oxide, magnesium hydroxide, calcium carbonate, huntite and hydromagnesite, barium sulfate, antimony oxide, magnesium silicate, clays, and borates. In various preferred embodiments of the present invention, the fire-retardant component comprises aluminum trihydrate. In various preferred embodiments of the present invention, the particulate component comprises titanium dioxide. In various preferred embodiments of the present invention, the resin component comprises a thermoset resin. In various embodiments of the present invention, the fiberglass veil comprises a previously formed fiberglass veil subsequently coated or impregnated with a slurry containing a fire-retardant component and particulate component in a resin system, wherein the resin used to form the initial fiberglass veil and the resin used to form the fire-retardant/particulate slurry comprise the same resin(s). In various embodiments, a fiber glass veil is formed using a resin binder system that contains a fire-retardant and particulate component in amount as described herein.

Another embodiment of the present invention includes a non-woven fiberglass veil, comprising: a plurality of glass fibers; a thermoset resin component; aluminum trihydrate; and titanium dioxide, the titanium dioxide comprising rutile titania having a low surface area to volume ratio and an average particle size of from about 0.1 to about 0.5 µm; wherein the aluminum trihydrate and titanium dioxide are present in a combined amount of from about 60% to about 80% by weight, based on the total weight of the veil, and wherein the fire-retardant component and the particulate component are present in a ratio by weight of from about 75:25 to about 55:45.

Yet another embodiment of the present invention includes a multilayer decorative laminate comprising at least one layer which is a non-woven fiberglass veil, comprising: a plurality of glass fibers; a resin component; a fire-retardant component; and a particulate component, the particulate component comprising inorganic particles having a low surface area to volume ratio and an average particle size of from about 0.1 to about 0.5 µm; wherein the fire-retardant component and the particulate component are present in a combined amount of from about 50% to about 90% by weight, based on the total weight of the veil, and wherein the fire-retardant component and the particulate component are present in a ratio by weight of from about 95:5 to about 50:50. Various additional embodiments include a multilayer decorative laminate wherein the at least one layer which is a non-woven fiberglass veil is a decorative element. Various additional embodiments include a multilayer decorative laminate wherein the non-woven fiberglass veil which is a decorative element provides an outer viewable surface of the laminate which has a 60° gloss value of from about 80 to about 120 or from about 100 to about 120, a distinctness of image of from about 35 to about 99 or from about 60 to about 99, a haze value of less than about 20 or less than about 15, and a peak specular reflectance of from about 30 to about 110. In addition, a difference between peak specular reference and the 60° gloss value can be less than 40.

Other aspects, features and advantages will be apparent from the following disclosure, including the detailed description, preferred embodiments, and the appended claims.

BRIEF DESCRIPTION OF SEVERAL VIEWS OF THE DRAWINGS

The foregoing summary, as well as the following detailed description of preferred embodiments of the invention, will be better understood when read in conjunction with the appended drawings. For purposes of illustration the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
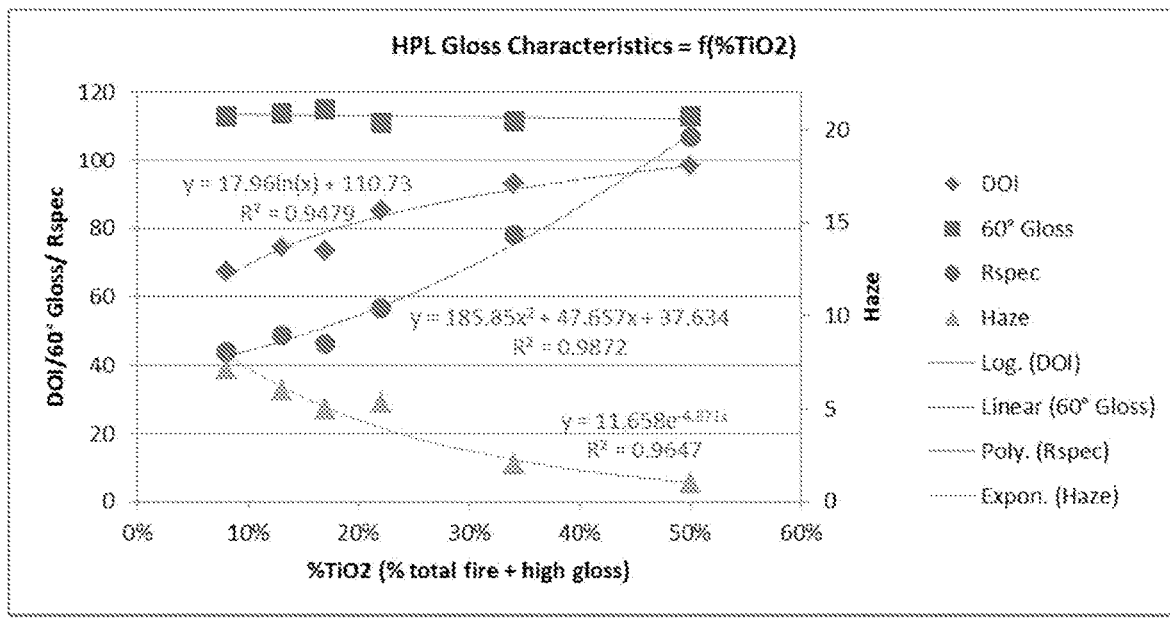
FIG. 1 is a graphical representation of gloss characteristics of samples according to an embodiment of the invention.

As used herein, the singular terms "a" and "the" are synonymous and used interchangeably with "one or more" and "at least one," unless the language and/or context clearly indicates otherwise. Accordingly, for example, reference to "a layer" or "the layer" herein or in the appended claims can refer to a single layer or more than one layer. Additionally, all numerical values, unless otherwise specifically noted, are understood to be modified by the word "about."

For simplicity and clarity of illustration, elements in the figures are not necessarily to scale, and the same reference numbers in different figures denote the same elements. For clarity of the drawing, elements are illustrated as having generally straight line edges and precise angular corners. However, those skilled in the art understand that the edges need not be straight lines and the corners need not be precise angles.

Certain terminology is used in the following description for convenience only and is not limiting. The words "right", "left", "lower", and "upper" designate directions in the drawing to which reference is made. The words "inwardly" and "outwardly" refer direction toward and away from, respectively, the geometric center of the object described and designated parts thereof. The terminology includes the words above specifically mentioned, derivatives thereof and words of similar import.

Various embodiments of the present invention relate to fiber veils which include a fire-retardant component and a particulate component. In various embodiments, such fiber veils can include fiberglass veils. In other words, in various embodiments, a veil of inorganic fibers oriented, randomly or in ordered fashion, are dispersed in a binder. Suitable inorganic fibers include glass but may be made of various other materials known in the art. In various preferred embodiments according to the present invention, glass fibers are used and the veils comprise fiberglass veils. Fiber veils, and preferably fiberglass veils, can be made by any suitable technique, including wet-laid techniques, using fibers and binders, such as for example, those techniques and materials described in U.S. Pat. Nos. 4,129,674, 4,112,174, 4,681,802, 4,810,576, 5,484,653, 6,187,697 and 8,084,378, the entire disclosures of each of which is hereby incorporated herein by reference. For example, in general, a slurry of glass fibers can be made by adding chopped glass fibers to an aqueous binder resin (optionally containing fire-retardant and particulate components in accordance with the invention) in a pulper to disperse the fibers in the resin, and feeding this slurry onto a moving inclined screen forming wire to dewater and form a wet nonwoven fibrous web.

Glass fibers suitable for use in fiberglass veils according to various embodiments disclosed herein can have various fiber diameters and lengths dependent on the strength and other properties desired in the veil as is well known. Glass fibers suitable for use in the present invention can be formed of any type of glass. In various preferred embodiments according to the invention, E-type glass fibers can be used. Glass fibers suitable for use in the various embodiments of the present invention can have diameters of from about 3 microns (µm) to about 25 microns. In various preferred embodiments, glass fibers having diameters in the range of 8 to 20 microns, and more preferably 8 to 12 microns, and more preferable about 10 microns. Glass fibers suitable for use in the various embodiments of the present invention can have any length dependent on desired mechanical properties. In various preferred embodiments, fiber lengths of from about 8 mm to about 20 mm can be used. The glass fibers used can all have about the same length, but fibers of different lengths and diameters can also be used to get different characteristics in a known manner.

In various embodiments of the present invention, resins suitable for use include thermoset resins. Generally, any suitable thermoset resin including, but not limited to, acrylics, vinyls (such as polyvinyl acetates and polyvinyl alcohols), polyesters, polyurethanes, phenoplasts, aminoplasts, diallyl-phthalates, epoxides, polyamides, cyanates, and polycyanurates, or copolymers, terpolymers or combinations thereof can be used. In various preferred embodiments of the present invention, suitable resin can include a phenolic and/or epoxy resin. In various preferred embodiments of the present invention, the resin comprises a melamine resin or a phenolic resin. In general, resins with lower heat of combustion values are preferred.

In various embodiments according to the present invention, fiber veils can be formed according to any of the aforementioned processes, such as wet-laid techniques, and subsequently treated with a slurry containing a resin, a fire-retardant component and a particulate component. Alternatively, fiber veils can be formed initially by such techniques wherein the slurry used in the wet-laid techniques contains a fire-retardant component and a particulate component. In various embodiments, fiberglass veils can be formed and subsequently treated with a slurry containing a resin, a fire-retardant component and a particulate component. For example, in various embodiments, commercially available fiberglass veils, such as those available under the tradenames Johns Manville 7610, Ahlstrom GFT-25G10-60, and Ahlstrom GFT-255M18-80, can be treated with a slurry containing a resin, a fire-retardant component and a particulate component. Fiberglass veils formed to have minimal surface irregularities are preferred. Fiberglass veils which have been prepared using wet-laid or dry-laid processes known in the art, wherein fibers are randomly oriented and bound together with a binder resin, along with various other optional ingredients, and which can be treated with a slurry to form fiberglass veils in accordance with the various embodiments of the present invention can generally have a basis weight prior to treatment with a slurry containing a fire-retardant component and a particulate component, of from about 20 gsm to about 110 gsm, and preferably from about 30 gsm to about 90 gsm. In various preferred embodiments of the present invention, in which a starting fiberglass veil is treated with a slurry to form a treated veil, the starting fiberglass veil can have a basis weight of from about 50 gsm to about 70 gsm. The resulting fiberglass veil can have a basis weight of from about 200 gsm to about 1200 gsm or from about 700 gsm to 800 gsm.

Slurries containing a fire-retardant component and a particulate component can be applied to a fiberglass veil in any known manner including, for example, dipping in a slurry bath or roll-coating. In various embodiments, a fiberglass veil can be supplied from a roll of material as a continuous web and run through a slurry of resin, fire-retardant component and particulate component in a resin bath, followed by an appropriate metering method to remove excess slurry, followed by at least partial drying in, for example, a hot air oven. Alternatively, for example, a slurry containing a resin, fire-retardant component and particulate component can be applied to a fiberglass veil using a roll coater and then smoothed and metered to the appropriate basis weight using a wire-wound metering rod (also known as a Mayer rod or bar). The coated veil can then be dried in a hot air oven to drive off volatile components. Fiberglass veils can be treated with slurries one or more times, preferably one or two coatings.

In various embodiments of the present invention, a fire-retardant component comprises a mineral fire retardant particle. Various fire-retardant components can be suitable for the various embodiments of the present invention, so long as the fire-retardant component is non-reactive with the resin system and incompressible. Accordingly, mineral-based fire-retardant particles are suitable for use in the various embodiments of the present invention. In various preferred embodiments of the present invention, a fire-retardant component comprises a component selected from aluminum trihydrate (ATH), zinc oxide, calcium carbonate, barium sulfate, magnesium hydroxide, and clays. In various preferred embodiments, a fire-retardant component comprises aluminum trihydrate. For example, in various preferred embodiments according to the present invention, a fire-retardant component includes aluminum trihydrate sourced as Polyfill 301 from Custom Grinders in Chatsworth, GA In the various embodiments of the present invention, the average particle size of the fire-retardant component can be from about 5 microns to about 20 microns. In various preferred embodiments according to the present invention, the average particle size of the fire-retardant component can be from about 9 microns to about 11 microns. In various preferred embodiments according to the present invention, the pH of the fire-retardant component can be from about 9 to about 10.

Fiberglass veils in accordance with the various embodiments of the present invention contain a particulate component. Particulate components suitable for use in various embodiments of the present invention generally have a shape or crystalline structure with a low surface area to volume ratio. Particulate components suitable for use in various embodiments of the present invention should generally have a refractive index higher than the fire-retardant component used. Particulate components suitable for use in various embodiments of the present invention preferably have an average particle size of from about 0.1 μm to about 0.5 μm. As mentioned above, particulate components suitable for use in the various embodiments of the present invention, generally have a shape with a low surface area to volume ratio. In other words, the particles of the various particulate components have shapes having a surface area which is lowest or approaching the lowest possible surface area for a given volume. Generally, spherical, spheroidal, ellipsoidal, rounded, particles are included. Cubes and minimally elongated cubic shapes can also be included so long as the shape has a low aspect ratio, for example, less than about 10:1, more preferably less than about 5:1, and more preferably less than about 2.5:1.

Particulate components suitable for use in the various embodiments of the present invention should generally have a refractive index higher than the fire-retardant component used. Particulate components suitable for use in the various embodiments of the present invention can include titanium dioxide, zinc oxide, barium sulfate, zinc sulfide, or like equivalents which include inorganic particles with refractive indices higher than that of the fire-retardant component used. For example, the refractive index of ATH is about 1.57. In various preferred embodiments of the present invention, the particulate component can comprise titanium dioxide. Preferably the titanium dioxide is rutile titania. In various preferred embodiments, the particulate component comprises rutile titania having a TiO2 content of greater than 99%, more preferably greater than 99.9%, and even more preferably greater than 99.99%. In the various embodiments, the average particle size of the titania particles is from about 0.1 μm to about 0.5 μm.

Fiberglass veils in accordance with the various embodiments of the present invention include (a) glass fibers, (b) a resin component, (c) a fire-retardant component and (d) a particulate component. In various embodiments of the present invention, the fiber glass veils can contain glass fibers in an amount of from about 5% to about 15%, by weight of the combined ingredients (a)-(d) of the veil. In various preferred embodiments of the present invention, the fiber glass veils can contain glass fibers in an amount of from about 5% to about 8%, by weight of the combined ingredients (a)-(d) of the veil. In various embodiments of the present invention, the veils can contain a resin component in an amount of from about 5% to about 30%, by weight of the combined ingredients (a)-(d) of the veil. The foregoing disclosed amount of resin can be comprised of resin used to prepare an untreated starting fiberglass veil and subsequent resin introduced via a treatment slurry providing a fire-retardant component and a particulate component. Alternatively, this amount of resin can be the result of the formation of a fiberglass veil in a wet-laid or other process wherein a fire-retardant component and a particulate component are provided in the process of initially forming the veil. In various embodiments of the present invention, the veils can contain a fire-retardant component in an amount of from about 25% to about 80%, by weight of the combined ingredients (a)-(d) of the veil. In various embodiments of the present invention, the veils can contain a particulate component in an amount of from about 4% to about 50%, by weight of the combined ingredients (a)-(d) of the veil.

In the various embodiments of the present invention, the fire-retardant component and the particulate component can be present in a ratio by weight of from about 95:5 to about 50:50. That is, in various embodiments of the present invention, aluminum trihydrate, for example, and titanium dioxide, for example, can be present in the fiberglass veils according to the various embodiments disclosed herein in a ratio by weight of ATH:TiO2 of from about 95:5 to about 50:50. In various preferred embodiments, the fire-retardant component and the particulate component can be present in a ratio by weight of from about 90:10 to about 55:45, from about 85:15 to about 55:45, from about 80:20 to about 55:45, from about 80:20 to about 60:40, from about 75:25 to about 60:40, from about 80:20 to about 65:35, from about 75:25 to about 65:35. In various preferred embodiments, the fire-retardant component and the particulate component are present in a ratio by weight of about 80:20, or about 70:30 or about 60:40. In certain preferred embodiments, the fire-retardant component and the particulate component are present in a ratio by weight of 80:20, or 70:30, or 60:40, each value of each ratio ±5%, more preferably ±2%, and even more preferably ±1%. In various preferred embodiments, each of the foregoing ratios by weight can apply specifically to each disclosed fire-retardant component and each disclosed particulate component in relation to one another. In addition, the fire-retardant component and the particulate component are present in a combined amount of from about 60% to about 80% by weight or from about 65% to about 75% by weight, based on the total weight of the veil.

Treatment slurries in accordance with various embodiments according to the present invention can additionally one or more optional additives such as surfactants, defoamers, rheology modifiers, anti-blocking agent, odorizing agent, insect repellent, anti-microbial agent, dyes, pigments and the like known in the art for inclusion in fiberglass veil or mat treatments.

Treatment slurries for application of a fire-retardant component and a particulate component to a preformed fiberglass veil in accordance with various embodiments of the present invention can have a solids content of about 57 to about 76%, and preferably from about 65 to about 75%. Treatment slurries for application of a fire-retardant component and a particulate component to a preformed fiberglass veil in accordance with various embodiments of the present invention are prepared as aqueous mixtures of a selected resin or resin system, a fire-retardant component, a particulate component and any optional ingredients as mentioned above. Treatment slurries for use in accordance with various embodiments according to the present invention are blended to achieve a uniform slurry and avoid agglomeration and dilatant rheology. Slurry viscosity should generally be >400 cP (Brookfield 50 rpm spindle 03, 25° C.) to achieve an adequate slurry coating weight and avoid sedimentation.

Fiberglass veils in accordance with the various embodiments of the present invention can be used as one or more layers in a multilayer decorative laminate product. In various embodiments according to the present invention, a laminate can comprise multiple layers of fiberglass veils according to the invention. In various embodiments according to the present invention, a laminate can comprise multiple layers of fiberglass veils which do not contain both a fire-retardant component and a particulate component upon which at least one upper layer comprising a fiberglass veil according to an embodiment of the invention is disposed. In various embodiments according to the invention, a laminate can comprise multiple fiberglass veil layers, according to either of the preceding embodiments, and further include one or more overlay layers which may include decorative layers and protective overlays known in the art. In additional embodiments, fiberglass veils in accordance with the various embodiments of the present invention can be used as one or more layers in a multilayer ballistic laminate product, or acoustic panel product. Various embodiments in which a ballistic panel includes a fiberglass veil in accordance with an embodiment of the present invention can further include an epoxy resin or viscoelastic material, and optionally one or more ballistic cloth materials such as, for example, an aramid fiber (e.g., Kevlar).

Laminates in accordance with various embodiments of the present invention can be prepared using any lamination method, including, for example, high pressure lamination (HPL), continuous pressure lamination (CPL), thermally fused melamine (TFM) methods, and other known methods. Suitable conditions of temperature, pressure and hold times can vary in accordance with parameters known in the art. Various pressing plates and apparatus known in the art can be used. In various embodiments according to the present invention, laminates produced using high pressure lamination can be preferred.

Fiberglass veils in accordance with various embodiments of the present invention can provide non-combustible and fire-retardant materials for laminates. As used herein, "non-combustible" refers to a fire-resistance rating of A2 or better (according to EN ISO 1716 and EN 13823). As used herein, "fire-retardant" refers to a fire-resistance rating of B or better (according to EN 13823 and EN 11925-2).

Thus, for example, depending on the desired basis weight of the resulting treated fiberglass veil, and the starting basis weight of the fiberglass prior to treatment with a slurry containing a fire-retardant component and a particulate component, A2-rated and fire-retardant treated veils can be obtained with resulting component contents as shown below in Table 1 and Table 2 (expressed in weight percent, Table 1, and in gsm, Table2). The amounts shown in Tables 1 and 2 are non-limiting and merely exemplary of suitable formulations. In the tables below, basis weight in the lefthand-most column refers to the resulting basis weight of the treated fiberglass veil. "Binder+Resin" refers to combined amounts of binder from the preformed veil and resin from the treatment slurry.

TABLE 1

| Scenario | Fire Class | Treated Fiberglass Composition (%) | | | |
|---|---|---|---|---|---|
| | | Fiberglass | Binder + Resin | ATH | TiO2 |
| Low Basis Weight (350 gsm) | Non-combustible | 7.5% | 9.3% | 79.0% | 4.2% |
| | Fire Retardant | 7.5% | 26.6% | 59.2% | 6.6% |
| High Basis Weight (1100 gsm) | Non-combustible | 5.7% | 10.7% | 37.6% | 46.0% |
| | Fire Retardant | 5.7% | 28.2% | 26.4% | 39.7% |

TABLE 2

| Scenario | Fire Class | Treated Fiberglass Composition (GSM) | | | |
|---|---|---|---|---|---|
| | | Fiberglass | Binder + Resin | ATH | TiO2 |
| Low Basis Weight (350 gsm) | Non-combustible | 26.4 | 32.4 | 276.6 | 14.6 |
| | Fire Retardant | 26.4 | 93.2 | 207.4 | 23.0 |
| High Basis Weight (1100 gsm) | Non-combustible | 63.0 | 117.9 | 413.6 | 505.5 |
| | Fire Retardant | 63.0 | 309.8 | 290.9 | 436.3 |

The invention will now be described in further detail with reference to the following non-limiting examples.

EXAMPLES

Examples 1a-1f

GFT-25G10-60 fiber glass veils having a basis weight of 60 gsm, obtained from Ahlstrom, were treated with six different slurries containing varying amounts of aluminum trihydrate (Polyfill 301 from Chatsworth Custom Grinders) and rutile titania using a melamine resin.

Slurries were applied to each veil using a double-pass reverse roll coating with a mayer bar. Four fiberglass veils in accordance with each of the six different slurry formulations were stacked and subjected to high pressure lamination at a temperature of about 130° C. and a pressure of 1300 psi for approximately a half hour.

The resulting laminates, as shown below in Table 3 (by weight percent) and Table 4 (gsm) were evaluated for 60° gloss, distinctness of image ("DOI"), peak specural reflectance, and haze using a Rhopoint IQ (Goniophotometer). The results of these analyses are set forth in FIG. 2. The surface gloss values were tested on the surface decorative melamine layer of the pressed laminate.

TABLE 3

| | % Total Mineral | Treated Fiberglass Composition (%) | | | |
|---|---|---|---|---|---|
| | | Fiberglass | Binder + Resin | ATH | TiO2 |
| Example 1a | 8% TiO2 | 7.2% | 20.4% | 66.6% | 5.8% |
| Example 1b | 13% TiO2 | 6.8% | 20.4% | 63.3% | 9.5% |
| Example 1c | 17% TiO2 | 6.6% | 20.3% | 60.6% | 12.4% |
| Example 1d | 22% TiO2 | 7.0% | 20.4% | 56.6% | 16.0% |
| Example 1e | 34% TiO2 | 7.3% | 20.4% | 47.7% | 24.6% |
| Example 1f | 50% TiO2 | 6.2% | 20.3% | 36.7% | 36.7% |

TABLE 4

| | % Total Mineral | Treated Fiberglass Composition (GSM) | | | |
|---|---|---|---|---|---|
| | | Fiberglass | Binder + Resin | ATH | TiO2 |
| Example 1a | 8% TiO2 | 45.6 | 129.4 | 423.2 | 36.8 |
| Example 1b | 13% TiO2 | 45.6 | 136.0 | 423.2 | 63.2 |
| Example 1c | 17% TiO2 | 45.6 | 140.8 | 419.6 | 86.0 |
| Example 1d | 22% TiO2 | 45.6 | 132.6 | 368.8 | 104.0 |
| Example 1e | 34% TiO2 | 45.6 | 127.4 | 298.3 | 153.7 |
| Example 1f | 50% TiO2 | 45.6 | 149.6 | 270.4 | 270.4 |

As can be seen from FIG. 1, the inclusion of a particulate component (rutile titania in this example), in increasing amounts relative to the combined total of fire-retardant component and particulate component, provides significantly increased and improved DOI, improved peak specular reflectance and better haze properties while maintaining exceptionally high 60° gloss values.

Figure 2:
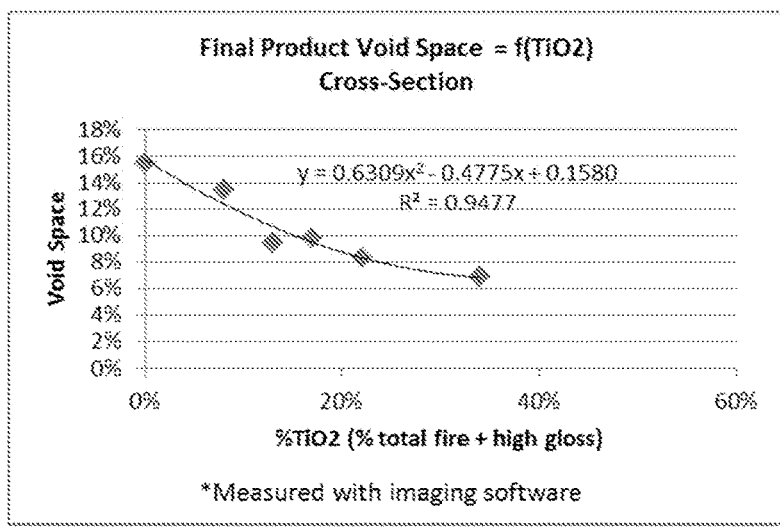
FIG. 2 is a graphical representation of void space characteristics of samples according to an embodiment of the invention.
Figure 3A:
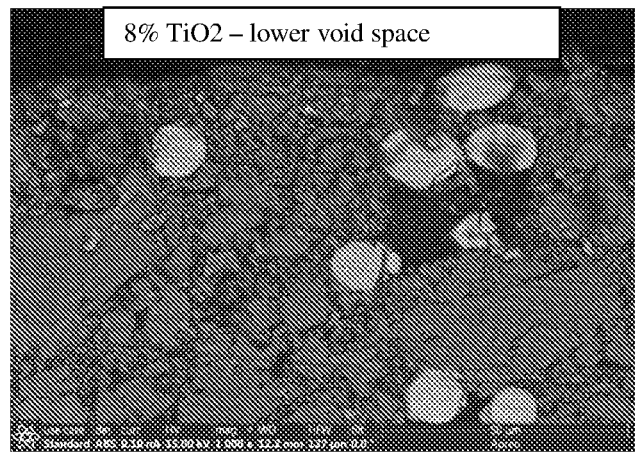
FIGS. 3a through 3e are images of cross-sectional scanning electron micrographs of various samples in accordance with embodiments of the invention.
Figure 3B:
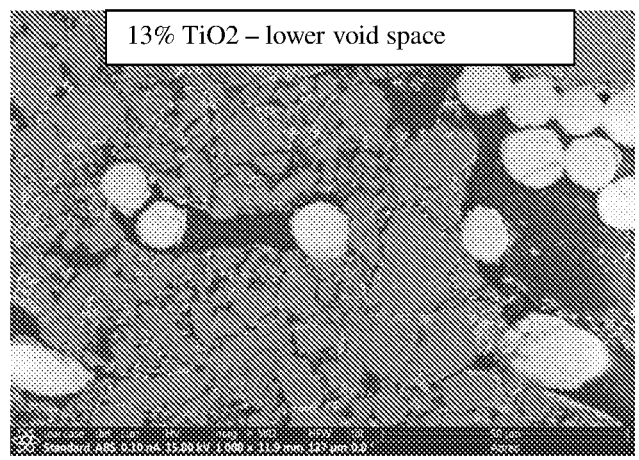
Figure 3C:
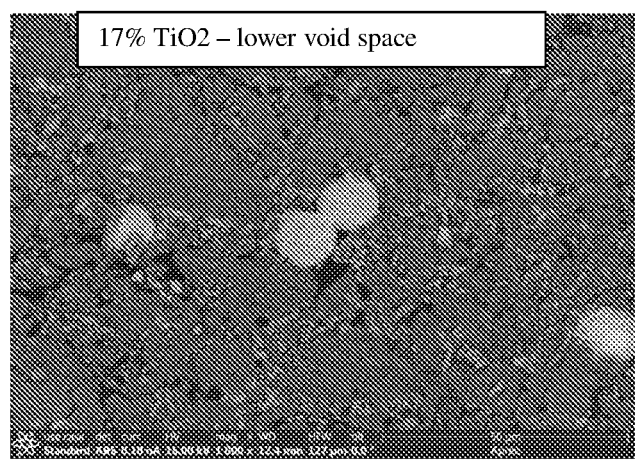
Figure 3D:
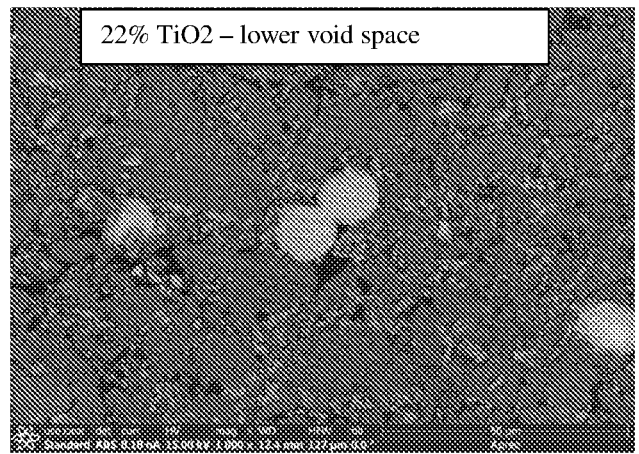
Figure 3E:
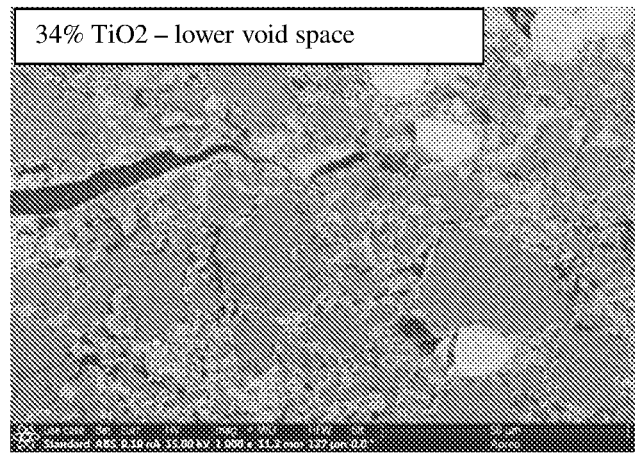
Figure 4A:
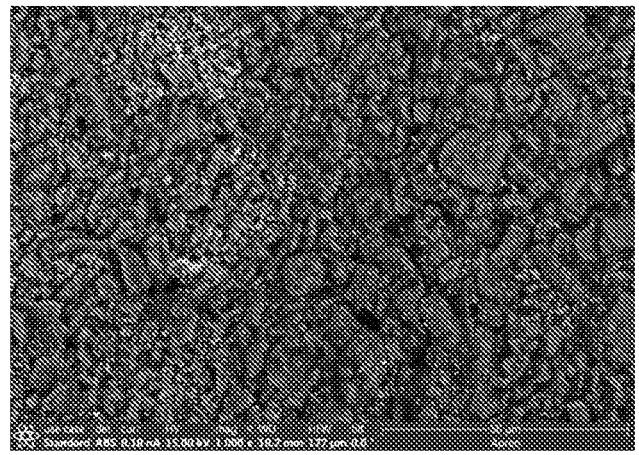
FIGS. 4a through 4e are images of surface view scanning electron micrographs of the various samples imaged in FIGS. 3a-3e.
Figure 4B:
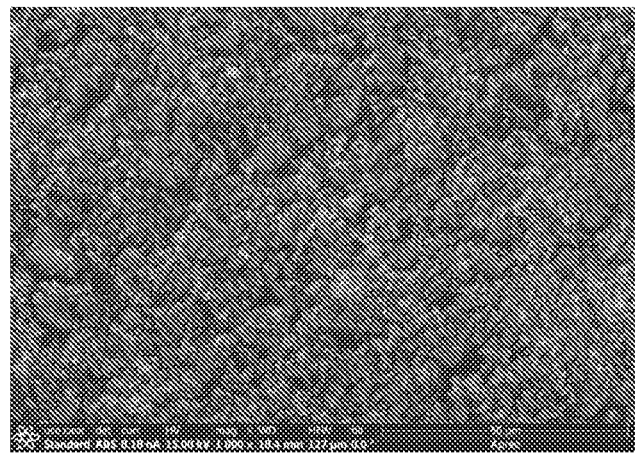
Figure 4C:
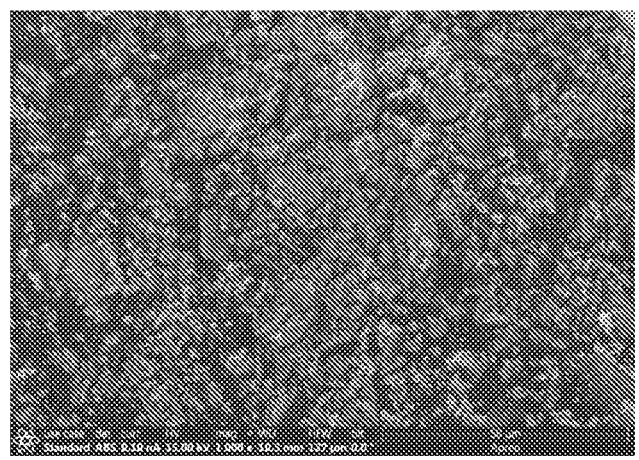
Figure 4D:
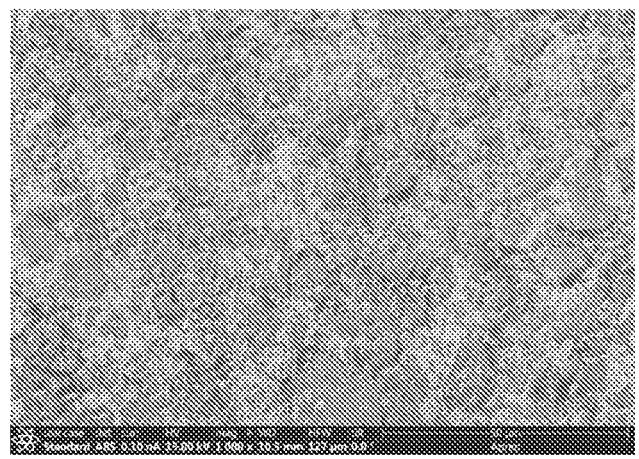
Figure 4E:
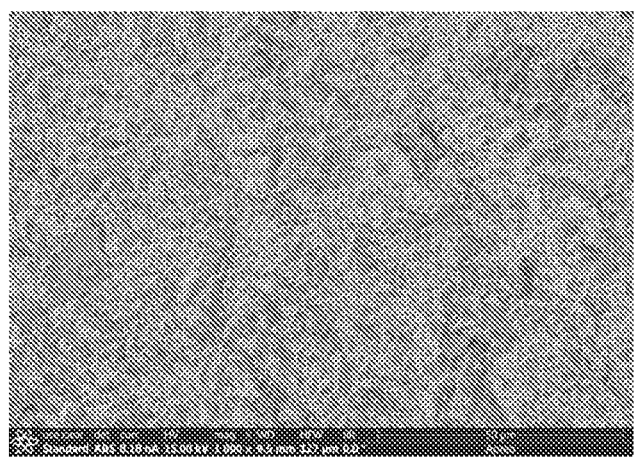

As shown in FIG. 2, void space decreases with the inclusion of $TiO_2$. Using the samples prepared in Examples 1a through 1e and imaging techniques (See Examples 3 & 4 below), void space was determined. A void space value for 0% $TiO_2$ in a sample corresponding to Examples 1a-1e was approximated using values from Example 2 below. Actual void space in 0% $TiO_2$ sample using higher basis weight materials was even higher at 22%. As $TiO_2$ inclusion is increased, replacing fire-retardant particles, void space decreases, reaching an approximate plateau in the vicinity of 50%.

Example 2

GFT-255M18-80 fiber glass veils having a basis weight of 80 gsm, obtained from Ahlstrom, were treated at both 0 and 34% TiO2 (% ATH replaced by TiO2), otherwise in identical fashion as that described in Examples 1a-1f. In terms of cross-sectional void space after pressing, we see a reduction from 22% to 13% with the addition of TiO2. This translates to an improvement of DOI from 55 to 91. The laminates prepared using the 80 gsm fiberglass and 0 and 34% titania were also compared with competitive products. The inclusion of titania results in superior DOI, haze, and Rspec compared to a fiberglass product with no titania, and both a CGS laminate product and MDF lacquer product. The results are summarized below in Table 5.

TABLE 5

| | 60° Gloss | DOI | Haze | Rspec |
|---|---|---|---|---|
| 0% TiO2 | 115 | 55 | 3.9 | 49 |
| 34% TiO2 | 115 | 91 | 5.6 | 60 |
| MDF Lacquer | 91 | 89 | 5 | 44 |
| CGS Laminate | 110 | 47 | 13 | 26 |

Examples 3 & 4

Scanning electron micrographs, both cross-sectional and surface view, of laminates prepared in accordance with Examples 1a-1e are shown in FIGS. 3a-3e (cross-sections) and FIGS. 4a-4e (surface view). As can be seen, void space decreases with the amount of titania replacing ATH.

It has additionally been found that various embodiments of the present invention can provide such an even, low-void substrate, shrinking paper has fewer void defects to amplify, and thus, even under accelerated drying conditions where paper shrinks more than fiberglass, the surface of laminated fiberglass bearing a decorative paper overlay does not exhibit amplified defects due to paper shrinkage. The addition of TiO2 further improves the appearance of a fiberglass core with a decorative paper surface, which is in turn an improvement over a 100% paper based product.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A non-woven fiberglass veil comprising: (a) a plurality of glass fibers, (b) a resin component, (c) a fire-retardant component and (d) a particulate component;
   wherein the particulate component (d) comprises inorganic particles having a refractive index higher than a refractive index of the fire-retardant component (c) and an average particle size of from about 0.1 to about 0.5 µm;
   wherein: the plurality of glass fibers (a) are present in an amount of about 5% to about 15% by weight of the combined (a)-(d), the resin component (b) is present in an amount of about 5% to about 30% by weight of the combined (a)-(d), the fire-retardant component (c) is present in an amount of about 25% to about 80% by weight of the combined (a)-(d), and the particulate component (d) is present in an amount of about 4% to about 50% by weight of the combined (a)-(d);
   wherein the fire-retardant component (c) and the particulate component (d) are present in a combined amount of from about 50% to about 90% by weight, based on the total weight of the non-woven fiberglass veil; and
   wherein the fire-retardant component (c) and the particulate component (d) are present in a ratio by weight of from about 95:5 to about 50:50.

2. The non-woven fiberglass veil according to claim 1, wherein fire-retardant component (c) comprises one or more selected from the group consisting of aluminum trihydrate, zinc oxide, magnesium hydroxide, calcium carbonate, huntite and hydromagnesite, barium sulfate, antimony oxide, magnesium silicate, clays, and borates.

3. The non-woven fiberglass veil according to claim 1, wherein the particulate component (d) comprises titanium dioxide.

4. The non-woven fiberglass veil according to claim 3, wherein the titanium dioxide comprises rutile titanium dioxide.

5. The non-woven fiberglass veil according to claim 1, wherein the resin component (b) comprises a thermoset resin.

6. The non-woven fiberglass veil according to claim 1, wherein the plurality of glass fibers (a) are random oriented and have an average fiber diameter of from about 8 µm to about 20 µm, and an average fiber length of from about 8 mm to 20 mm.

7. The non-woven fiberglass veil according to claim 1, wherein the non-woven fiberglass veil has a basis weight of from about 200 gsm to about 1200 gsm.

8. The non-woven fiberglass veil according to claim 1, wherein the fire-retardant component (c) and the particulate component (d) are present in a combined amount of from about 60% to about 80% by weight, based on the total weight of the non-woven fiberglass veil.

9. The non-woven fiberglass veil according to claim 1, wherein the fire-retardant component (c) and the particulate component (d) are present in a combined amount of from about 65% to about 75% by weight, based on the total weight of the non-woven fiberglass veil.

10. The non-woven fiberglass veil according to claim 1, wherein the fire-retardant component (c) and the particulate component (d) are present in a ratio by weight of from about 80:20 to about 50:50.

11. The non-woven fiberglass veil according to claim 1, wherein the fire-retardant component (c) and the particulate component (d) are present in a ratio by weight of from about 75:25 to about 55:45.

12. The non-woven fiberglass veil according to claim 1, wherein the fire-retardant component (c) and the particulate component (d) are present in a ratio by weight of from about 70:30 to about 60:40.

13. The non-woven fiberglass veil according to claim 1, wherein the particulate component (d) comprises one or more selected from the group consisting of titanium dioxide, zinc oxide, barium sulfate, and zinc sulfide.

14. A multilayer decorative laminate comprising at least one layer of the non-woven fiberglass veil according to claim 1.

15. The multilayer decorative laminate according to claim 14, wherein the at least one layer of the non-woven fiberglass veil is a decorative element.

16. The multilayer decorative laminate according to claim 15, wherein an outer viewable surface of the laminate has a 60° gloss value of from about 100 to about 120, a distinctness of image of from about 60 to about 99, a haze value of less than about 15, and a difference between peak specular reflectance and the 60° gloss value of less than 40.

17. The multilayer decorative laminate according to claim 16, wherein the at least one layer of the non-woven fiberglass veil is an outer surface layer.

18. The multilayer decorative laminate according to claim 15, wherein an outer viewable surface of the decorative laminate has a 60° gloss value of from about 80 to about 120, a distinctness of image from about 35 to about 99, a haze value less than about 20, and a peak specular reflectance from about 30 to about 110.

19. A non-woven fiberglass veil, comprising: a plurality of glass fibers; a thermoset resin component; aluminum trihydrate; and titanium dioxide, the titanium dioxide comprising rutile titania having a low surface area to volume ratio and an average particle size of from about 0.1 to about 0.5 µm; wherein the aluminum trihydrate and titanium dioxide are present in a combined amount of from about 60% to about 80% by weight, based on the total weight of the non-woven fiberglass veil, and wherein the aluminum trihydrate and the titanium dioxide are present in a ratio by weight of from about 75:25 to about 55:45.

20. The non-woven fiberglass veil according to claim 19, wherein the non-woven fiberglass veil has a basis weight of from about 700 gsm to 800 gsm.

21. A multilayer decorative laminate comprising at least one layer of the non-woven fiberglass veil according to claim 19.

* * * * *